Patented Oct. 27, 1925.

1,559,393

UNITED STATES PATENT OFFICE.

THEODORE WHITTELSEY, OF UPPER MONTCLAIR, AND CHARLES E. BRADLEY, OF MONTCLAIR, NEW JERSEY, ASSIGNORS TO THE NAUGATUCK CHEMICAL COMPANY, A CORPORATION OF CONNECTICUT.

PROCESS FOR TREATING RUBBER AND SIMILAR MATERIALS AND TO THE PRODUCTS OBTAINED THEREBY.

No Drawing.   Application filed February 19, 1920.   Serial No. 359,818.

*To all whom it may concern:*

Be it known that we, THEODORE WHITTELSEY and CHARLES E. BRADLEY, both citizens of the United States, residing in Upper Montclair, county of Essex, State of New Jersey, and Montclair, county of Essex, and State of New Jersey, respectively, have invented certain new and useful Improvements in Processes for Treating Rubber and Similar Materials and to the Products Obtained Thereby, of which the following is a full, clear, and exact description.

This invention relates to processes for treating rubber and similar materials and to the products obtained thereby, and it is more particularly related to the process of vulcanizing rubber by a sulphur compound. A probable explanation of the use of various accelerators in the vulcanization of rubber is that they react with the sulphur ordinarily employed to provide nascent sulphur or an extremely active type of sulphur which in turn must react with the rubber to provide vulcanization. There is thus introduced in the vulcanization process an extra time element consumed in the reaction between the accelerator and the vulcanizing agent and the reaction between the product of this union with the rubber. In addition certain accelerators such as lead oxide lend their coloration to the stock, others impart an undesirable odor to the vulcanized rubber, and in general the better accelerators introduce considerable added expense in the vulcanizing process.

One of the objects of the present invention accordingly is to provide a vulcanizing agent and a process for vulcanization which shall improve the speed of vulcanization. Another object of the invention is to provide a simple vulcanizing process in which the vulcanizing agent shall provide a vulcanized product free from objectionable color, odor, etc. Another object of the invention is to provide a series of vulcanized products substantially free from bloom and having improved ageing properties.

The invention accordingly broadly consists in subjecting rubber or similar material, such as various synthetic rubbers, balata, gutta percha, and substances usually classed under the term "rubber" to a vulcanizing agent adapted to transfer from itself sulphur to the rubber under vulcanizing conditions with or without the addition of an accelerator, and vulcanizing the rubber. The invention comprises more specifically the vulcanization of rubber with a substantially halide-free reaction product of a sulphur halide and an amine. It comprises also the products of such processes and especially a vulcanized rubber free from bloom and containing relatively small amounts of free or combined sulphur.

Consideration of the vulcanizing action of sulphur monochloride indicates that the sulphur therein contained is present in a condition to form easily the active sulphur desired in vulcanization, and it has appeared desirable to provide more stable compounds of a similar structure and of somewhat less reactivity. The production of such materials by replacing the chlorine with various organic radicals has been found to be possible and the resulting products have the desired stability.

In carrying out the invention in its preferred form 100 parts of rubber are combined with 2 parts of phenylimidothiosulphurous acid $C_6H_5NS_2$. The materials are placed in a mold with a steam pressure of 40 lbs. per square inch and cure is effected in twenty minutes. Phenylimidothiosulphurous acid contains sulphur which is adapted to be transferred from itself to the rubber under vulcanizing conditions. Similarly the other vulcanizing agents herein set forth are able to transfer the sulphur contained therein. Phenylimidothiosulphurous acid is preferably prepared as follows: 3 molecules by weight of aniline and 1 molecule by weight of sulphur monochloride are combined in a nonaqueous solvent, preferably benzol. Aniline hydrochloride is precipitated and the compound $C_6H_5NS_2$ is formed. The aniline hydrochloride is removed by filtration and the benzol is evaporated in vacuo leaving the desire compound phenylimidothiosulphurous acid which is then ready for use.

The structural formula for the phenylimidothiosulphurous acid here produced is probably $C_6H_5N=S=S$. It is probable that this formula is correct although it will be understood that the invention is not to be limited to this conception of the material used. Sulphur compounds like the reaction product of aniline and sulphur monochloride appear to have in general the unstable sulphur radical represented in the above formula as S=S, representing an unstable bond between the sulphur atoms. The activity of some of the materials of the class including phenylimidothiosulphurous acid is such that vulcanization may be accomplished at 100° C. or slightly therebelow without the use of an organic accelerator. Furthermore although the cure has been set forth in a specific example above as carried out in a mold, it may also be carried out in open air or steam.

Another product which has given satisfactory results and is of a similar nature to phenylimidothiosulphurous acid is a reaction product of ammonia and sulphur chloride, having a probable formula of $N_4S_4$. The structural formula of this material has been determined to be:

In using this material 100 parts of rubber are mixed with 2 parts of the ammonia sulphur chloride derivative. The mixture is placed in a mold and vulcanized under the steam pressure of 40 lbs. per square inch until vulcanization is complete, which occurs in approximately ten minutes. This material is extremely reactive and care must be taken to prevent over-curing of the rubber both by avoiding excessive temperature and excessive time of vulcanization. In this connection it is pointed out that both temperature and time elements of the materials of the class hereing described may be modified by the inclusion therewith of an accelerator, for example, an amine or a derivative thereof, such as dimethylammonium dimethyldithiocarbamate.

In carrying out the use of the materials with such accelerators 100 parts of rubber are mixed with 10 parts of zinc oxide, 0.1 part of dimethylammonium dimethyldithiocarbamate, and 2 parts of phenylimidothiosulphurous acid. The mixture is so prepared and placed in the mold and vulcanized under steam pressure of 40 lbs. per square inch for ten minutes, when vulcanization is complete. The material may be allowed to remain in the mold from thirty to sixty minutes or longer, if desired, without over-curing.

Where the reaction product of ammonia and sulphur chloride is employed 100 parts of rubber are mixed with 10 parts of zinc oxide, 0.1 part of dimethylammonium dimethyldithiocarbamate, and 2 parts of the reaction product of sulphur chloride and ammonia. The mixture so prepared is placed in a mold and vulcanized under 40 lbs. steam pressure for ten minutes, when vulcanization is completed. The material may be allowed to remain in the mold from ten to forty minutes and longer, if desired, without over-curing.

The reaction product of sulphur chloride and ammonia mentioned above is preferably prepared as follows:

An excess of gaseous ammonia is run into a 5% (by weight) carbon tetrachloride solution of sulphur chloride. Ammonium chloride is precipitated and the compound, which is believed to be nitrogen sulphide is formed. The material is purified, removing sulphur and ammonium chloride.

Various other materials may be employed constituting products of the action of sulphur halide and groups capable of replacing halide in acid halides. Among these substances may be mentioned the hexamethylene tetramine derivative of thiosulphurous acid made by combining hexamethylene tetramine with sulphur chloride; paranitrophenylimidothiosulphurous acid, $NO_2C_6H_4$ NS=S, formed by the action of paranitraniline on sulphur chloride; para or ortho toluylimidothiosulphurous acid, $CH_3C_6H_4$ NS=S, formed by the action of ortho or para toluidine on sulphur chloride; methylimidothiosulphurous acid, $CH_3NS=S$, formed by the action of methylamine on sulphur chloride; teramethyldiamidothiosulphurous acid,

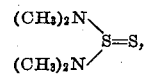

formed by the action of dimethylamine on sulphur chloride; diethylester of thiosulphurous acid,

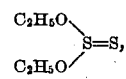

formed by the addition of sodium alcoholate to sulphur chloride. It will be noted in connection with the preparation of the various substances above, that the chloride of the material added to the sulphur chloride is formed as a rection product, and before vulcanization is preferably removed from the mass in any convenient manner.

The compounds mentioned above may be considered in general to be comprised under the general type $RS_2$ in which either nitrogen or oxygen may be attached to the sulphur. It is also probable that nitrogen and oxygen may be replaced by either sulphur or carbon, and other similar elements or groups. These compounds may be considered as derivatives of the hypothetical acid

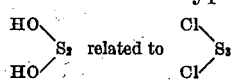

They may be prepared by replacing one or both of the chlorines of sulphur monochloride by various groups. This type of curing agent is characterized by the property of regenerating a cold curing agent, probably sulphur monochloride or the like, when treated with gaseous hydrogen chloride in benzol solvent. In carrying out this test, a small amount of the curing material is added to a rubber cement in a test tube, and gaseous hydrogen chloride is led in. Solidification of the mass indicates vulcanization, and hence that the material being tested is a member of the class herein described.

The reformation of a cold curing agent from the material is perhaps due to the assumed double bonded linking of sulphur S=S, which resembling as it does the assumed linking in sulphur chloride is adapted upon coming in contact with gaseous hydrochloric acid to regenerate the sulphur chloride, which serves as a cold curing agent.

The vulcanized material made in accordance with the process as indicated possesses the various advantages of stock cured in the ordinary manner with sulphur as such. It will be observed that the speed of cure is vastly superior to that found when ordinary sulphur is employed. Stocks produced in accordance with the process herein set forth have excellent physical qualities, and contain relatively small amounts of sulphur combined or otherwise, the combined sulphur being approximately ½% or less. The products have superior ageing properties and tensile strengths and are free from bloom.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:—

1. A process for vulcanizing rubber which consists in treating rubber with a substantially halide-free reaction product of a sulphur halide and an amine, said reaction product having the structural formula $RS_2$, where R represents a nonhalogen substitution, and vulcanizing the rubber.

2. A process for vulcanizing rubber which consists in treating rubber with a substantially halide-free reaction product of a sulphur halide and an amine, said reaction product having the structural formula $RS_2$, where R represents a nonhalogen substitution containing at least one atom of nitrogen, and vulcanizing the rubber.

3. A process for vulcanizing rubber which consists in treating rubber with a substantially halide free reaction product of a sulphur halide and an amine, said reaction product exhibiting the general structure of an imidothiosulphurous acid derivative, and vulcanizing the rubber.

4. A process for treating rubber which comprises subjecting the rubber to a reaction product of aniline and sulphur halide, and vulcanizing the rubber.

5. A process of treating rubber comprising combining it with a substantially halide-free reaction product of sulphur chloride and anilin, and vulcanizing the rubber.

6. A process of treating rubber comprising combining it with a substantially halide-free sulphur halide and amine-reaction product, and a nitrogen-containing accelerator, and vulcanizing the rubber.

7. A process of treating rubber comprising combining it with a substantially chloride-free reaction product of sulphur chloride and anilin, and a dithiocarbamate accelerator, and vulcanizing the rubber.

8. A process for treating rubber which comprises subjecting the rubber to an amine accelerator and an organic material containing hydrogen and sulphur adapted to produce a cold curing agent with HCl, and vulcanizing the rubber.

9. Rubber vulcanized with a substantially halide-free reaction product of a sulphur halide and an amine, said reaction product having the general structure of an imidothiosulphurous acid.

10. Rubber vulcanized with a substantially halide-free reaction product of a sulphur halide and an amine, said reaction product having the general structure of an imidothiosulphurous acid, and having at least one nitrogen atom in the substituted portion of said acid.

11. Rubber vulcanized with phenylimidothiosulphurous acid.

Signed at Tampa, Florida, this 11th day of February, 1920.

THEODORE WHITTELSEY.

Signed at New York city, New York, this 17th day of February, 1920.

CHARLES E. BRADLEY.